United States Patent Office 3,477,291
Patented Nov. 11, 1969

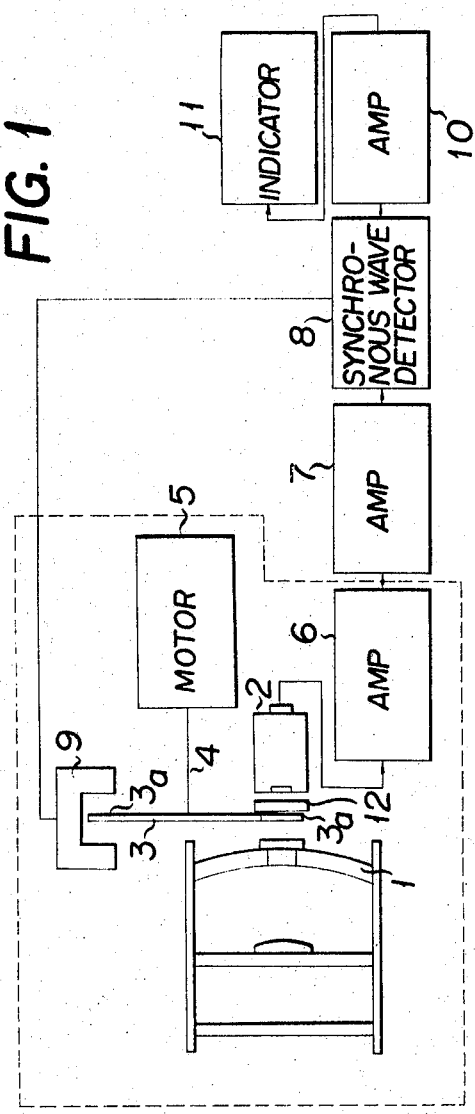
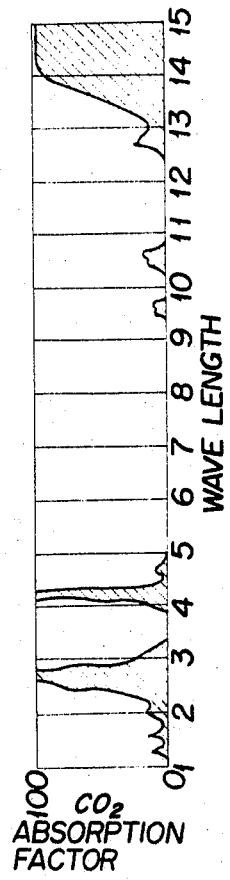
FIG. 1
FIG. 2

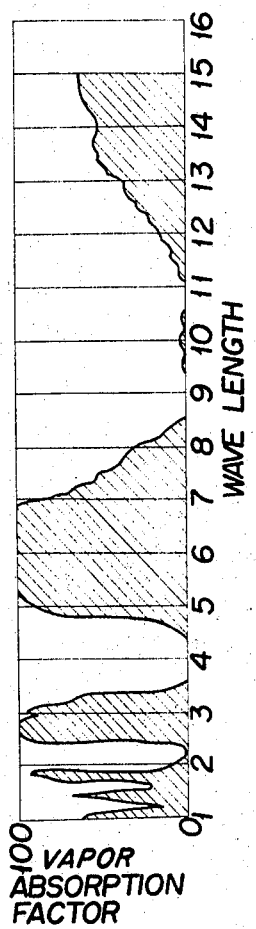
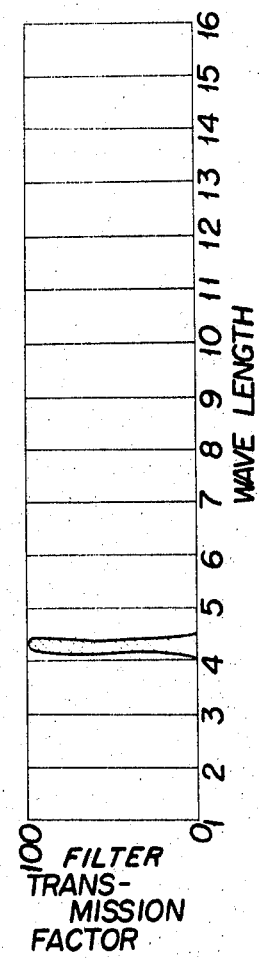

3,477,291
RADIATION THERMOMETERS
Hideo Osawa, Yokohama-shi, Yosio Sakamoto, Sagamihara-shi, and Masayuki Kondo, Ayase-machi, Kozagun, Kanagawa-ken, Japan, assignors to Tokyo Shibaura Electric Co., Ltd., Kawasaki-shi, Japan, a corporation of Japan
Filed Sept. 6, 1967, Ser. No. 665,790
Claims priority, application Japan, Sept. 5, 1966, 41/58,262
Int. Cl. G01k 13/00
U.S. Cl. 73—355                                       1 Claim

ABSTRACT OF THE DISCLOSURE

A radiation thermometer capable of measuring the temperature of an object by measuring the quantity of infrared rays radiated from the object. A filter passing only radiation having a wavelength of 4.26±0.2 microns is placed between the object and thermometer to eliminate the effects of sunlight and aqueous vapor in the atmosphere.

---

This invention relates to thermometers, and more particularly to a radiation thermometer wherein the temperature of an object can be measured without contact by measuring the amount of infrared rays emitted from the object to be measured.

When such a radiation thermometer is used in the atmosphere, the light receiver portion of the thermometer receives not only the infrared rays emitted from the body to be measured, but also sun light reflected from the body to be measured as well as from other objects. The infrared rays contained in the sun light tend to cause erroneous readings, and the reading on the thermometer indicates a false value higher than the actual value. Further, when a body of aqueous vapor is present between the object to the measured and the light receiver portion of the thermometer, the vapor will absorb part of the infrared rays radiated from the object to be measured, thus allowing the thermometer to indicate a value lower than the actual thermal value. Thus, in the environment where sun light and vapor are present, the thermometer does not function to indicate a correct value, and this restricts and applicable place where it is used.

An object of this invention, therefore, is to provide a radiation thermometer which is free from the influence of the sun light and vapor and is capable of indicating an accurate value of a measured temperature irrespective of places where it is used and of other geographical conditions.

Further objects and advantages of this invention will become apparent from the following detailed description, reference being had to the accompanying drawing, in which:

FIG. 1 is a block diagram showing one embodiment of this invention;

FIG. 2 is a graph showing the characteristic of an absorption distribution of infrared rays by $CO_2$ in the atmosphere;

FIG. 3 is a view similar to FIG. 2, showing an absorption distribution of infrared rays in vapor; and FIG. 4 is a graph showing the infrared rays-transmitting property of an optical filter used in this invention.

In FIG. 1, the reference numeral 1 is a lens assembly for focussing infrared rays radiated from an object to be measured. An infrared ray detector 2 is positioned so that its detection face is placed at the focussing point of the lens assembly 1. A disc 3 is provided so that its peripheral portion will intersect the axial line connecting the lens assembly 1 and the infrared ray detector 2. The axis 4 of said disc 3 is connected to a motor 5. The disc 3 has a plurality of indentations 3a which are equally spaced along the peripheral portion of the disc. Thus, infrared rays will be projected on the infrared ray detector 2 in the form of intermittent rays by the rotation of the disc 3. The detector 2 functions to convert the amount of the projected infrared rays into an electrical signal proportional thereto. To the output terminal of said detector is connected an AC amplifier 7 via a pre-amplifier 6. A synchronous detector 8 is connected to the output terminal of said AC amplifier 7. Said synchronous detector 8 is supplied with a signal from a synchronous signal generator 9, said signal having a cycle corresponding to that of the indentations 3a of said disc 3. The output terminal of the synchronous detector 8 is connected to an indicator 11 through a DC amplifier 10.

In the path of incidence of the infrared rays between the disc 3 and the detector 2 an optical filter 12 is positioned. This filter 12 is not necessarily located between the disc 3 and the infrared ray detector 2, but may be positioned at any position in the path of incidence of infrared rays ahead of the infrared ray detector 2.

The absorption distribution of infrared rays transmitted through the atmosphere (by $CO_2$ in the atmosphere) is shown in FIG. 2. The absorption distribution of infrared rays passed through water vapor is shown in FIG. 3. When the sun light and vapor which cause erroneous readings are considered, the sun light is transmitted through a long distance in the atmosphere. In order to eliminate the undesired influence on the measurement, it is desired that infrared rays in the sun light be absorbed by $CO_2$ present in the atmosphere. Also, water vapor in the atmosphere absorbs the infrared rays radiated from an object to be measured, thus causing errors in reading. To eliminate these errors, the infrared rays radiated from the object to be measured should be prevented from being absorbed by such vapor. If detection is made only with respect to infrared rays which satisfy the above two conditions, it is possible to achieve the measurement of temperature, free from the influences of the sun light and vapor and the like. It will be seen from FIGS. 2 and 3 that infrared rays of a wavelength in the proximity of $4.26\mu$ satisfy these conditions. Thus, this invention utilizes, as said filter 12, an optical filter of such a property that will transmit infrared rays of a wavelength of around $4.26\mu$. According to experiments made, the actually applicable range of the wavelength is $4.26\pm0.2\mu$.

The operation of the device will now be explained. The infrared rays radiated from the object to be measured are focussed by the lens assembly 1 and projected on the infrared ray detector 2. The projected rays are converted into intermittent rays of a predetermined cycle by the action of the disc 3 which is rotated at a constant speed by means of the motor 5, and only that portion of the infrared rays that has a wavelength of around $4.26\mu$ is selectively projected on the infrared ray detector 2 by the action of the optical filter 12. An AC signal proportional to the amount of the infrared rays thus projected is generated at the output terminal of the infrared ray detector 2, and then is amplified by the pre-amplifier 6 and the AC amplifier 7 and introduced into the synchrous detector 8. The synchronously detected signal is amplified by the DC amplifier 10 and operates the indicator 11. The indicator 11 may be calibrated so that the temperature of the object may be directly read on the indicator.

When the measurement of temperature is to be made in the atmosphere, for instance, the sun light reflected from the object to be measured and from other substances will be projected on the detector 2 of the thermometer. However, the sun light thus reflected does not include, as shown in FIG. 2, infrared rays of a wavelength in the proximity of 4.26µ, and thus does not cause erroneous readings. Also, when water vapor is present between the object to be measured and the detector, the infrared rays radiated from the object to be measured that have wavelengths of around 4.26µ are not absorbed as shown in FIG. 3, so that the presence of the vapor also does not cause erroneous readings. Thus, according to this invention, the radiation thermometer can indicate precisely and correctly the temperature of the object irrespective of conditions and circumstances it is to be used.

According to this invention, measurement is given only to the infrared rays of wavelengths of around 4.26µ (4.26±0.2µ) which are absorbed by $CO_2$, but are not absorbed by vapor, so that the measured value is not influenced by the presence of the sun light and vapor.

What is claimed is:

1. A radiation thermometer comprising an infrared ray-detector which converts the amount of infrared rays into an electrical signal proportional thereto, an optical filter which limits the infrared rays projected on said detector to those having wavelengths of a range of 4.26±0.2µ, and an indicator which indicates a temperature on the basis of the output signal from said infrared ray detector.

References Cited
UNITED STATES PATENTS

| | | | |
|---|---|---|---|
| 2,677,277 | 5/1954 | Machler | 73—355 |
| 2,856,540 | 10/1958 | Warshaw | 73—355 XR |
| 3,091,693 | 5/1963 | Rudomanski et al. | 73—355 XR |

LOUIS R. PRINCE, Primary Examiner

FREDERICK SHOON, Assistant Examiner